(12) United States Patent
Sato et al.

(10) Patent No.: US 7,601,790 B2
(45) Date of Patent: Oct. 13, 2009

(54) AMPHIPHILIC BLOCK COPOLYMER, POLYMER-CONTAINING COMPOSITION CONTAINING THE SAME, AND METHOD AND APPARATUS FOR APPLYING LIQUID USING THE POLYMER-CONTAINING COMPOSITION

(75) Inventors: Koichi Sato, Atsugi (JP); Ryuji Higashi, Atsugi (JP); Masayuki Ikegami, Atsugi (JP); Keiichiro Tsubaki, Kawasaki (JP); Ikuo Nakazawa, Zama (JP); Sakae Suda, Sagamihara (JP); Keiko Yamagishi, Ebina (JP); Takeshi Okada, Zushi (JP); Kohei Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 10/546,596

(22) PCT Filed: Jan. 14, 2005

(86) PCT No.: PCT/JP2005/000721

§ 371 (c)(1),
(2), (4) Date: Aug. 22, 2005

(87) PCT Pub. No.: WO2005/068524

PCT Pub. Date: Jul. 28, 2005

(65) Prior Publication Data

US 2006/0128828 A1    Jun. 15, 2006

(30) Foreign Application Priority Data

Jan. 15, 2004   (JP) .............................. 2004-008497
Sep. 6, 2004    (JP) .............................. 2004-258826

(51) Int. Cl.
*C08F 12/24* (2006.01)
*C08F 16/12* (2006.01)

(52) U.S. Cl. ................. 526/313; 526/333; 526/317.1; 526/346

(58) Field of Classification Search ................. 526/313, 526/333, 317.1, 346
See application file for complete search history.

(56) References Cited

U.S. PATENT DOCUMENTS

| | | | |
|---|---|---|---|
| 5,085,698 A | 2/1992 | Ma et al. ........................ 106/20 |
| 7,004,579 B2 | 2/2006 | Sato et al. .................... 347/105 |
| 7,056,972 B2 | 6/2006 | Nakazawa et al. ........... 524/505 |
| 7,067,590 B2 | 6/2006 | Sato et al. .................... 525/299 |
| 2005/0027037 A1 | 2/2005 | Sato et al. |
| 2005/0033010 A1 | 2/2005 | Sato et al. ...................... 528/80 |
| 2005/0131102 A1 | 6/2005 | Nakazawa et al. ........... 523/160 |
| 2005/0140762 A1 | 6/2005 | Sato et al. .................... 347/100 |
| 2005/0197424 A1 | 9/2005 | Higashi et al. ............... 523/160 |
| 2005/0209367 A1 | 9/2005 | Sato et al. .................... 523/161 |
| 2005/0219277 A1 | 10/2005 | Sato et al. ...................... 347/1 |
| 2005/0239918 A1 | 10/2005 | Nakazawa et al. ........... 523/160 |
| 2005/0249925 A1 | 11/2005 | Ikegami et al. ............ 428/195.1 |
| 2006/0004124 A1 | 1/2006 | Tsubaki et al. ............... 523/160 |
| 2006/0047015 A1 | 3/2006 | Duda et al. .................. 523/160 |
| 2006/0050117 A1 | 3/2006 | Sato et al. .................... 347/100 |
| 2006/0057485 A1 | 3/2006 | Teshima et al. ............ 430/108.8 |
| 2006/0100310 A1 | 5/2006 | Nakazawa et al. ........... 523/160 |
| 2006/0144287 A1 | 7/2006 | Tsubaki et al. ............. 106/31.13 |
| 2006/0146087 A1 | 7/2006 | Sato et al. ...................... 347/21 |
| 2006/0148997 A1 | 7/2006 | Sato et al. .................... 525/299 |
| 2006/0160975 A1 | 7/2006 | Suda et al. ................... 526/330 |
| 2006/0178468 A1 | 8/2006 | Sato et al. .................... 524/556 |
| 2006/0221117 A1 | 10/2006 | Sato et al. ...................... 347/21 |

FOREIGN PATENT DOCUMENTS

| | | |
|---|---|---|
| EP | 1 357 138 A1 | 10/2003 |
| EP | 1357138 A1 * | 10/2003 |
| JP | H11-080221 | 3/1999 |
| JP | H11-322866 | 11/1999 |
| JP | H11-322942 | 11/1999 |
| WO | 2004/005362 A2 | 1/2004 |
| WO | 2004/035013 A2 | 4/2004 |
| WO | 2004/101635 A2 | 11/2004 |

OTHER PUBLICATIONS

Sadahito Aoshima et al., "Living Cationic Polymerization of Vinyl Monomers by Organoaluminium Halides", Polymer Bulletin, vol. 15, pp. 417-423 (1986).

* cited by examiner

*Primary Examiner*—William K Cheung
(74) *Attorney, Agent, or Firm*—Fitzpatrick, Cella, Harper & Scinto (57) ABSTRACT

An amphiphilic block copolymer having an ionic functional group, wherein the ratio (N10/N5) of a rotational viscosity (N10) of a 10% by mass solution of the copolymer in purified water to a rotational viscosity (N5) of a 5% by mass solution of the copolymer in purified water is 2.5 or lower.

8 Claims, 1 Drawing Sheet

FIG. 1

AMPHIPHILIC BLOCK COPOLYMER, POLYMER-CONTAINING COMPOSITION CONTAINING THE SAME, AND METHOD AND APPARATUS FOR APPLYING LIQUID USING THE POLYMER-CONTAINING COMPOSITION

TECHNICAL FIELD

The present invention relates to an amphiphilic block copolymer, a polymer-containing composition containing the same, and a method and an apparatus for applying a liquid using the polymer-containing composition.

BACKGROUND ART

As aqueous dispersion materials containing a functional substance have heretofore been well known, as functional materials, agricultural chemicals such as herbicides and insecticides, medicaments such as anti-cancer drugs, antiallergic drugs and antiphlogistics, and coloring materials containing a colorant, such as inks and toners. In recent years, digital printing technology has been vigorously developed. Typical examples of this digital printing technology include those called electrophotographic technology and ink-jet technology, and its importance as image-forming technology in offices, homes and the like has increased more and more in recent years.

Among these, the ink-jet technology as a direct recording method has such a great feature that it is compact and low in consumed power. The formation of high-quality images is also quickly advanced by formation of micro-nozzles or the like. An example of the ink-jet technology includes a method wherein an ink fed from an ink tank is evaporated and bubbled by heating it by a heater in a nozzle, thereby ejecting the ink to form an image on a recording medium. Another example includes a method wherein an ink is ejected from a nozzle by causing a piezoelectric element to vibrate.

Since aqueous dye solutions are generally used as inks used in these ink-jet methods, in some cases, bleeding may occur when inks of different colors overlap with each other, or a phenomenon called feathering may appear in a direction of fibers in paper at a recorded portion on a recording medium. In order to improve these problems, U.S. Pat. No. 5,085,698 discloses the use of pigment-dispersed inks.

However, the ejection stability of an ink composition, among ink-jet recording properties, may not be sufficiently achieved in some case. A specific example includes a case where after an ink is ejected from a predetermined nozzle in an ink-jet recording head, the ink may be hard to stably re-eject when the ink is re-ejected from the nozzle after the ejection of the ink from the nozzle is suspended for a certain period of time. Besides, many other improvements are still desired under the circumstances.

DISCLOSURE OF THE INVENTION

The present invention has been completed in view of such problems included in the background art, and has as its object the provision of a block copolymer by which a functional substance can be satisfactorily dispersed in a solvent.

Another object of the present invention is to provide a polymer-containing composition containing the block copolymer and having good dispersibility, fixing ability and environmental resistance.

A further object of the present invention is to provide a method and an apparatus for applying a liquid using the polymer-containing composition.

The above objects can be achieved by the present invention described below.

In a first aspect of the present invention, there is thus provided an amphiphilic block copolymer having an ionic functional group, wherein a ratio (N10/N5) of a rotational viscosity (N10) of a 10% by mass solution of the copolymer in purified water to a rotational viscosity (N5) of a 5% by mass solution of the copolymer in purified water is 2.5 or lower.

In the first aspect of the present invention, the amphiphilic block copolymer may preferably be a block copolymer having at least one hydrophobic block segment and at least one hydrophilic segment and having both nonionic hydrophilic unit and ionic hydrophilic unit.

The amphiphilic block copolymer may preferably be a block copolymer having a structure that a hydrophobic block segment, a nonionic hydrophilic segment and an ionic hydrophilic segment are arranged in that order. In a preferable embodiment of the present invention, the amphiphilic block copolymer may be a block copolymer, in which a polymerization degree ratio between the hydrophobic block segment, nonionic hydrophilic segment and ionic hydrophilic segment arranged in that order is such that the proportion of the polymerization degree of the nonionic hydrophilic segment is 8 or lower and that of the ionic hydrophilic segment is 5 or lower when that of the hydrophobic block segment is regarded as 10.

Further preferably, the amphiphilic block copolymer may be a block copolymer containing a polyvinyl ether structure as a repeating unit structure.

In a second aspect of the present invention, there is also provided a polymer-containing composition comprising a block copolymer, a solvent or dispersing medium and a functional substance, wherein the block copolymer is any one of the amphiphilic block copolymers described above.

In the second aspect of the present invention, the polymer-containing composition may preferably be such that the functional substance is included in the block copolymer.

In a third aspect of the present invention, there is further provided a liquid-applying method comprising ejecting the polymer-containing composition described above on a recording medium by applying energy to the polymer-containing composition.

In a fourth aspect of the present invention, there is still further provided a liquid-applying apparatus comprising a liquid-applying means for applying the polymer-containing composition described above to a recording medium by applying energy to the polymer-containing composition and a driving means for driving the liquid-applying means.

According to the present invention, there can be provided a block copolymer by which a functional substance can be satisfactorily dispersed in a solvent. According to the present invention, there can also be provided a polymer-containing composition containing the block copolymer and having good dispersibility, fixing ability and environmental resistance. Further, a method and an apparatus for applying a liquid using the polymer-containing composition can be provided.

BEST MODE FOR CARRYING OUT THE INVENTION

The present invention will hereinafter be described in detail.

In the first aspect of the present invention, there is provided an amphiphilic block copolymer having an ionic functional group, wherein a ratio (N10/N5) of a rotational viscosity (N10) of a 10% by mass solution of the copolymer in purified water to a rotational viscosity (N5) of a 5% by mass solution of the copolymer in purified water is 2.5 or lower.

The rotational viscosity means the viscosity that can be measured by means of an E-type rotational viscometer, dynamic rheometer or the like when applying a certain rotational shear. The rotational viscosity can be measured by means of an E-type rotational viscometer or dynamic rheometer. The measurement of the viscosity is conducted at 25° C.

The amphiphilic block copolymer according to the present invention characteristically has an ionic functional group. The amphiphilic property means the nature of being soluble in 2 solvents insoluble in each other, the nature of having a soluble site and an insoluble site with respect to a certain solvent or the nature of having an affinitive site and a non-affinitive site with respect to a certain solvent. In the present invention, the amphiphilic block copolymer is preferably a block copolymer having a site having affinity for water or a hydrophilic solvent and a site having no affinity for water or the hydrophilic solvent.

In the block copolymer according to the present invention, the ratio (N10/N5) of a rotational viscosity (N10) of a 10% by mass solution of the copolymer in purified water to a rotational viscosity (N5) of a 5% by mass solution of the copolymer in purified water is 2.5 or lower, preferably 2.0 or lower, more preferably 1.6 or lower. If the ratio exceeds 2.5, ejection stability may be deteriorated in some case when a dispersion of a functional substance, which will be described subsequently, is prepared, or ink-jet recording, which will be described subsequently, is conducted. The respective segments of the block copolymer may be copolymer segments. The form of the copolymer is not limited. For example, it may be either of a random segment or a graduation segment.

The amphiphilic block copolymer is preferably a block copolymer having at least one hydrophobic block segment and at least one hydrophilic segment and having both a nonionic hydrophilic unit and an ionic hydrophilic unit. In this case, a polymerization degree ratio of the hydrophobic segment to the hydrophilic segment is preferably such that the proportion of the total polymerization degree of the hydrophilic units is 13 or lower when the proportion of the polymerization degree of the hydrophobic segment is regarded as 10.

Further, the amphiphilic block copolymer is preferably a block copolymer having a structure in which a hydrophobic block segment, a nonionic hydrophilic segment and an ionic hydrophilic segment are arranged in that order. In a preferable embodiment of the present invention, the amphiphilic block copolymer is a block copolymer in which the polymerization degree ratio between the hydrophobic block segment, nonionic hydrophilic segment and ionic hydrophilic segment arranged in that order is such that the proportion of the polymerization degree of the nonionic hydrophilic segment is 8 or lower and that of the ionic hydrophilic segment is 5 or lower when the proportion of the polymerization degree of the hydrophobic block segment is regarded as 10. In a more preferable embodiment of the present invention, the amphiphilic block copolymer is a block copolymer in which the polymerization degree ratio between the hydrophobic block segment, nonionic hydrophilic segment and ionic hydrophilic segment arranged in that order is such that the proportion of the polymerization degree of the nonionic hydrophilic segment is 5 or lower and that of the ionic hydrophilic segment is 3 or lower when the proportion of the polymerization degree of the hydrophobic block segment is regarded as 10. Incidentally, the block copolymer is a copolymer in which polymer segments composed of different repeating unit structures are bonded to each other by a covalent bond and is also called a block polymer.

Specific examples of the block copolymer according to the present invention include conventionally known block copolymers such as acrylic or methacrylic block copolymers, block copolymers composed of polystyrene and any other addition polymerization monomers or condensation polymerization monomers, and block copolymers having polyoxyethylene and polyoxyalkylene blocks. In the present invention, the block copolymer is more preferably in a block form of AB, ABA, ABD, or the like. A, B, and D indicate block segments different from one another. In the present invention, the block copolymer may be a graft copolymer in which another polymer is bonded in the shape of a character 'T' to a certain copolymer chain. The block copolymer according to the present invention preferably contains a polyvinyl ether structure as a repeating unit structure.

As a specific structure of the ionic block segment, the ionic segment is preferably of a repeating unit represented by the following general formula (1)

wherein $R^0$ is $-X-(COOH)_r$ or $-X-(COO\text{-}M)_r$, X is a linear, branched or cyclic alkylene group having 1 to 20 carbon atoms, or $-(CH(R^5)-CH(R^6)-O)_p-(CH_2)_m-CH_{3-r}-$, $-(CH_2)_m-(O)_n-(CH_2)_q-CH_{3-r}-$ or a modified structure there of in which at least one of the methylene groups of these groups is substituted by a carbonyl group or an aromatic ring structure, r is 1 or 2, p is an integer of from 1 to 18, m is an integer of from 0 to 35, n is 1 or 0, q is an integer of from 0 to 17, M is a monovalent or polyvalent cation, and $R^5$ and $R^6$ are alkyl groups and may be the same or different from each other.

Further, at least one of the hydrophobic block segment, nonionic hydrophilic segment and ionic hydrophilic segment is preferably a repeating unit represented by the following general formula (2)

wherein $R^1$ is selected from a linear, branched or cyclic alkyl group having 1 to 18 carbon atoms, -Ph, -Pyr, -Ph-Ph, -Ph-Pyr, $-(CH(R^5)-CH(R^6)-O)_p-R^7$ and $-(CH_2)_m-(O)_n-R^7$, in which hydrogen and carbon in the aromatic ring may be substituted by a linear or branched alkyl group having 1 to 4 carbon atoms and nitrogen, respectively, p is an integer of from 1 to 18, m is an integer of from 1 to 36, n is 1 or 0, $R^5$ and $R^6$ are, independently of each other, hydrogen or $-CH_3$, and $R^7$ is hydrogen, a linear, branched or cyclic alkyl group hav- ing 1 to 18 carbon atoms, -Ph, -Pyr, -Ph-Ph, -Ph-Pyr, —CHO, —CH$_2$CHO, —CO—CH═CH$_2$, —CO—C(CH$_3$)═CH$_2$ or —CH$_2$COOR$^8$, with the proviso that when R$^7$ is any other group than hydrogen, hydrogen bonded to carbon in R$^7$ may be substituted by a linear or branched alkyl group having 1 to 4 carbon atoms, —F, —Cl or —Br, and carbon in the aromatic ring may be substituted by nitrogen, in which R$^8$ is an alkyl group having 1 to 5 carbon atoms, and Ph and Pyr denote a phenyl group and a pyridyl group, respectively.

Specific examples of the repeating unit structure represented by the general formula (1) are:

wherein Ph denotes a phenylene group.

Specific examples of the repeating unit structure represented by the general formula (2) include:

wherein Ph denotes a phenylene group.

Examples of a repeating unit as the nonionic hydrophilic segment include those mentioned below.

The block segments of the block copolymer according to the present invention may be composed of a single repeating unit structure or plural repeating unit structures. Examples of the block segment composed of plural repeating unit structures include random copolymers and graduation copolymers in which a compositional ratio is gradually changed.

Further, the block copolymer according to the present invention may be a polymer in which a block copolymer structure is graft-bonded to another polymer.

In the present invention, the content of the repeating unit structure represented by the general formula (1) or (2) contained in the block copolymer is within a range of from 0.01 to 99 mol %, preferably from 1 to 90 mol % based on the total of the block copolymer. If the content is lower than 0.01 mol %, the polymeric interaction caused by the ionic functional group, hydrophobic group or nonionic hydrophilic group may become insufficient in some cases. If the content exceeds 99 mol %, the interaction may overact on the contrary, and the function may become insufficient in some cases.

The number average molecular weight (Mn) of the block copolymer according to the present invention is within a range of from 200 to 10,000,000, preferably from 1,000 to 1,000,000. If the molecular weight exceeds 10,000,000, entanglement within a polymer chain and between polymer chains becomes too much, and so such a copolymer may be hard to be dispersed in a solvent. If the molecular weight is lower than 200, the molecular weight may be too low to exhibit a steric effect as a polymer. A preferable polymerization degree of each block segment is from 3 to 10,000, preferably from 5 to 5,000, more preferably from 10 to 4,000.

In order to improve the dispersion stability and inclusion property of a functional substance, the molecular mobility of the block copolymer is preferably more flexible, because such a block copolymer easily makes physical entanglement with a surface of a functional substance to show affinity for it. Therefore, the glass transition temperature Tg of the main chain of the block copolymer is preferably 20° C. or lower, more preferably 0° C. or lower, still more preferably −20° C.

or lower. In this regard, a copolymer having a polyvinyl ether structure is preferably used, because it generally has a low glass transition point and is hence flexible. In the case of the examples of the repeating unit structures mentioned above, their glass transition temperatures may be often about $-20°$ C. or lower.

The polymerization of the block copolymer preferably used in the present invention and having the polyvinyl ether repeating unit structure is often carried out mainly by cationic polymerization. Examples of an initiator include combinations of a protonic acid such as hydrochloric acid, sulfuric acid, methanesulfonic acid, trifluoroacetic acid, trifluoromethanesulfonic acid and perchloric acid, or a Lewis acid such as $BF_3$, $AlCl_3$, $TiCl_4$, $SnCl_4$, $FeCl3$, $RAlCl_2$ and $R_{1.5}AlCl_{1.5}$ (R is alkyl) with a cation source (examples of the cation source include protonic acids, water, alcohols and adducts of vinyl ether and a carboxylic acid). Polymerization reaction is allowed to progress by causing these initiators to coexist with polymerizable compounds (monomers), whereby the block copolymer can be synthesized.

The polymerization of the block copolymer preferably used in the present invention and having the polyvinyl ether repeating unit structure more preferably contains the polyvinyl ether repeating unit structure in a proportion of at least 50 mol %, preferably at least 70 mol %, more preferably at least 90 mol %.

A polymerization process more preferably used in the present invention will be described. Many synthesizing processes for a polymer containing a polyvinyl ether structure have been reported (for example, Japanese Patent Application Laid-Open No. H11-080221). Processes according to cationic living polymerization by Aoshima, et al. (Journal of Polymer Bulletin, Vol. 15, p. 417, 1986; and Japanese Patent Application Laid-Open Nos. H11-322942 and H11-322866) are representative thereof. By conducting polymer synthesis according to the cationic living polymerization, various polymers such as homopolymers, copolymers composed of two or more monomers, block copolymers, graft polymers and graduation polymers can be synthesized with their chain lengths (molecular weights) made exactly uniform. Besides, the living polymerization may also be conducted in an $HI/I_2$ system, $HCl/SnCl_4$ system or the like.

In the block copolymer according to the present invention, its critical micelle concentration is preferably 0.2 g/L from the viewpoint of having such viscosity as described above. For that purpose, the number average molecular weight of the hydrophobic block segment is preferably 3,000 or higher, more preferably 5,000 or higher, still more preferably 7,000 or higher.

The second aspect of the present invention will be described.

In the second aspect of the present invention, there is provided a polymer-containing composition comprising a solvent or dispersing medium, a functional substance and the block copolymer according to the present invention. The composition contains the block copolymer described above and a functional substance exhibiting a useful prescribed function, such as a coloring material. The block copolymer can be suitably used for well dispersing the functional substance and the like.

The functional substance is preferably liquid or solid and may also be a soluble substance. For example, oils, pigments, metals, herbicides, insecticides, biological materials, drugs, molecular catalysts, etc., may also be used.

The content of the block copolymer according to the present invention in the polymer-containing composition according to the present invention is from 0.1 to 99% by mass, preferably from 0.3 to 70% by mass based on the total mass of the composition according to the present invention. If the content of the block copolymer is lower than 0.1% by mass, the dispersibility of the functional substance may become insufficient in some cases. If the content exceeds 99% by mass, the viscosity of the resulting composition may become too high in some cases.

Further, the content of the functional substance contained in the composition according to the present invention is from 0.1% by mass to 80% by mass, preferably from 0.5% by mass to 60% by mass. If the content is lower than 0.1% by mass, the prescribed function may not be fully developed in some cases. If the content exceeds 80% by mass, the functional substance may not be sufficiently dispersed in some cases.

The polymer-containing composition according to the present invention may also contain a solvent or a dispersing medium. A binder resin may also be used as the dispersing medium. As the solvent or dispersing medium, may be used water, a hydrophilic solvent, a nonaqueous organic solvent or the like. It goes without saying that a mixture thereof may be used.

Examples of usable hydrophilic solvents include polyhydric alcohols such as ethylene glycol, diethylene glycol, triethylene glycol, polyethylene glycol, propylene glycol, polypropylene glycol and glycerol; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen-containing solvents such as N-methyl-2-pyrrolidone, substituted pyrrolidone and triethanolamine. Besides, monohydric alcohols such as methanol, ethanol and isopropyl alcohol may also be used.

Examples of usable nonaqueous organic solvents include hydrocarbon solvents such as hexane, heptane, octane, decane and toluene, and solvents such as cyclohexane, acetone, methyl ethyl ketone and butyl acetate. Natural oils and fats such as olive oil, soybean oil, beef tallow and lard may also be used.

Examples of the binder resin include styrene-acrylic copolymers and polyesters.

The content of the solvent or dispersing medium in the polymer-containing composition according to the present invention is from 1% by mass to 99% by mass, preferably from 10% by mass to 95% by mass. If the content is lower than 1% by mass or exceeds 99% by mass, the functional substance may not be sufficiently dispersed in some cases.

Other components than those described above may be contained in the polymer-containing composition according to the present invention. Additives such as various kinds of surfactants, ultraviolet absorbents, antioxidants and stabilizers may also be contained.

In the polymer-containing composition according to the present invention, a coloring material and water as a solvent are used to prepare a dispersion by using, for example, the above-described ABD triblock polymer, whereby the coloring material can be included in micelle formed by the ABD triblock polymer, and so a coloring material-included type ink composition may also be formed. In addition, the particle diameter of the particles in the dispersed composition may be made very even and uniform. Further, the dispersed state thereof may also be made extremely stable. The inclusion of the coloring material in the micelle formed by the ABD triblock polymer means that the coloring material is introduced into a core part of the micelle formed and dispersed in a solution.

The included state can be formed by, for example, mixing a solution or dispersion of a coloring material in an organic solvent insoluble with water with micelles formed by the block copolymer in water by means of a dispersing machine or the like for the purpose of introducing the coloring material into the micelle, and then distilling off the organic solvent.

Besides, it may also be formed by the phase inversion in which the polymer and the coloring material dissolved in an organic solvent are put into a hydrophilic solvent followed by distilling off the remaining organic solvent. Further, it may be formed by the phase inversion in which the polymer dissolved in an organic solvent and the coloring material dispersed therein are put into a hydrophilic solvent.

The confirmation of the included state can be performed by various kinds of electron microscopes and/or instrumental analyses such as X-ray diffraction.

In the case of inclusion in a micelle state, the included state can be indirectly confirmed by separation of the coloring material from the solvent separately from the polymer under conditions of micelle collapse.

In the present invention, at least 90% of the functional substance is preferably included.

The polymer-containing composition according to the present invention is preferably used as an ink composition. In this case, a crude composition is prepared by using such a dispersion process described above. After the preparation, additives or a solvent is added to prepare a final composition. When it is considered to conduct concentration adjustment by adding various additives or a solvent afterward, it is preferable to set the concentrations of the functional substance and polymer in the crude composition as high as possible for the purpose of obtaining the final composition with ease and high productivity. When it is attempted to obtain a crude composition at a high concentration as much as possible, the above-described dispersion process has to be conducted at a high concentration as much as possible. If the viscosity becomes high in the course of the dispersion process in this case, the functional substance may not be satisfactorily dispersed in some cases. When the block copolymer according to the present invention is used, however, the ratio (N10/N5) of a rotational viscosity (N10) of a 10% by mass solution of the copolymer in purified water to a rotational viscosity (N5) of a 5% by mass solution of the copolymer in purified water becomes 2.5 or lower, namely, a lower viscosity can be realized with a high concentration in a hydrophilic solvent, so that a crude composition can be provided at a higher concentration.

An ink-jet ink composition, which is a preferred embodiment of the composition according to the present invention, will now be described. The content of the block copolymer according to the present invention in an ink-jet ink composition is from 0.3% by mass to 80% by mass, preferably 0.3% by mass to 30% by mass, more preferably from 1.0% by mass to 25% by mass, most preferably from 2% by mass to 20% by mass or from 3% by mass to 15% by mass. The fact that the content of the block copolymer is at least 1.0% by mass, at least 2% by mass or at least 3% by mass in a preferred mode as the ink-jet ink composition greatly contributes to improvements of fixing ability to recording media and weatherability of coloring materials. In view of this situation, the fact that the ratio (N10/N5) of the rotational viscosity (N10) of the 10% by mass solution of the copolymer in purified water to the rotational viscosity (N5) of the 5% by mass solution of the copolymer in purified water becomes 2.5 or lower, namely, the lower viscosity can be realized with a high concentration in a hydrophilic solvent, must be said to have a surprising effect.

Other components than the block copolymer contained in the ink-jet ink composition according to the present invention will hereinafter be described in detail. The other components include water, hydrophilic solvents, coloring materials, additives, etc. Examples of these components include those described above.

Pigments and dyes are representative of the coloring materials. The pigments may be either organic pigments or inorganic pigments. As pigments used in inks, may preferably be used black pigments and pigments of three primary colors of cyan, magenta and yellow. Incidentally, other color pigments than those described above, colorless or light-colored pigments and metalescent pigments may also be used. In the present invention, commercially available pigments or newly synthesized pigments may also be used. These pigments may be used in combination with dyes.

Examples of commercially available pigments in black, cyan, magenta and yellow are mentioned below.

As examples of black pigments, there may be mentioned Raven 1060 (product of Columbian Carbon Co.), MOGUL-L (product of Cabot Company), Color Black FW1 (product of Degussa AG) and MA 100 (product of Mitsubishi Chemical Corporation). However, the present invention is not limited thereto.

As examples of cyan pigments, there may be mentioned C.I. Pigment Blue 15:3, C.I. Pigment Blue 15:4 and C.I. Pigment Blue 16. However, the present invention is not limited thereto.

As examples of magenta pigments, there may be mentioned C.I. Pigment Red 122, C.I. Pigment Red 123 and C.I. Pigment Red 146. However, the present invention is not limited thereto.

As examples of yellow pigments, there may be mentioned C.I. Pigment Yellow 74, C.I. Pigment Yellow 128 and C.I. Pigment Yellow 129. However, the present invention is not limited thereto.

Pigments self-dispersible in water may also be used in the ink composition according to the present invention. The pigments dispersible in water include those making good use of steric hindrance by adsorbing a polymer on the surface of a pigment and those making good use of electrostatic repulsion force. Examples of commercially available self-dispersing pigments include CAB-O-JET200 and CAB-O-JET300 (both, trade names; products of Cabot Company), and Microjet Black CW-1 (trade name; product of Orient Chemical Industries Ltd.).

The pigment used in the ink composition according to the present invention is preferably used in an amount of from 0.1 to 50% by mass based on the total mass of the ink composition. If the amount is less than 0.1% by mass, sufficient image density may not be achieved. If the amount exceeds 50% by mass, the pigment may aggregate and may not be dispersed. A more preferable range of the amount is from 0.5% by mass to 30% by mass.

In the ink composition according to the present invention, dyes may also be used. Such water-soluble dyes such as direct dyes, acid dyes, basic dyes, reactive dyes and food dyes, and insoluble colorants such as disperse dyes as described below may be used.

Examples of water-soluble dyes include:

direct dyes such as C.I. Direct Black 17, 62 and 154; C.I. Direct Yellow 12, 87 and 142; C.I. Direct Red 1, 62 and 243; C.I. Direct Blue 6, 78 and 199; C.I. Direct Orange 34 and 60; C.I. Direct Violet 47 and 48; C.I. Direct Brown 109; and C.I. Direct Green 59, acid dyes such as C.I. Acid Black 2, 52 and 208; C.I. Acid Yellow 11, 29 and 71; C.I. Acid Red 1, 52 and 317; C.I. Acid Blue 9, 93 and 254; C.I. Acid Orange 7 and 19; and C.I. Acid Violet 49, reactive dyes such as C.I. Reactive Black 1, 23 and 39; C.I. Reactive Yellow 2, 77 and 163; C.I. Reactive Red 3, 111 and 221; C.I. Reactive Blue 2, 101 and 217; C.I. Reactive Orange 5, 74 and 99; C.I. Reactive Violet 1, 24 and 38; C.I. Reactive Green 5, 15 and 23; and C.I. Reactive Brown 2, 18 and 33, and C.I. Basic Black 2; C.I. Basic Red 1, 12 and 27; C.I. Basic Blue 1 and 24; C.I. Basic Violet 7, 14 and 27; and C.I. Food Black 1 and 2.

As examples of oil-soluble dyes, commercially available products of various colors are mentioned below.

As examples of oil-soluble dyes of black, there may be mentioned C.I. Solvent Black 3, 22:1 and 50. However, the present invention is not limited thereto.

As examples of oil-soluble dyes of yellow, there may be mentioned C.I. Solvent Yellow 1, 25:1 and 172. However, the present invention is not limited thereto.

As examples of oil-soluble dyes of orange, there may be mentioned C.I. Solvent Orange 1, 40:1 and 99. However, the present invention is not limited thereto.

As examples of oil-soluble dyes of red, there may be mentioned C.I. Solvent Red 1, 111 and 229. However, the present invention is not limited thereto.

As examples of oil-soluble dyes of violet, there may be mentioned C.I. Solvent Violet 2, 11 and 47. However, the present invention is not limited thereto.

As examples of oil-soluble dyes of blue, there may be mentioned C.I. Solvent Blue 2, 43 and 134. However, the present invention is not limited thereto.

As examples of oil-soluble dyes of green, there may be mentioned C.I. Solvent Green 1, 20 and 33. However, the present invention is not limited thereto.

As examples of oil-soluble dyes of brown, there may be mentioned C.I. Solvent Brown 1, 12 and 58. However, the present invention is not limited thereto.

The dye used in the ink composition according to the present invention is preferably used in an amount of from 0.1 to 50% by mass based on the total mass of the ink composition. Incidentally, these coloring materials described above are preferred for the ink composition according to the present invention. However, coloring materials used in the ink composition according to the present invention are not particularly limited to those described above.

The liquid-applying method according to the third aspect of the present invention making use of the composition according to the second aspect of the present invention will now be described.

In a preferred embodiment of the present invention, there is provided a liquid-applying method comprising ejecting a liquid composition from an ejection part to apply the liquid composition to a recording medium, thereby conducting recording. The ejection part means a nozzle or orifice, in which a driving element used in a general ink-jet system is provided. The liquid-applying method is preferably used as various image-forming methods such as a pattern-forming method in which a certain pattern is formed on a recording medium, various printing methods in which images and characters are formed on a recording medium, ink-jet methods, and electrophotographic methods, with the ink-jet methods being particularly preferred. A usable ink-jet method may be a well known method such as a piezo ink-jet system using a piezoelectric element or a thermal ink-jet system that thermal energy is applied to an ink to bubble the ink, thereby conducting recording. Either a continuous type or an On-Demand type may also be used. However, the On-Demand type ink-jet method is preferred. In the On-Demand type ink-jet method, a liquid composition or ink composition is ejected from an ejection part, i.e., a nozzle, to conduct recording on a recording medium. The nozzle diameter of this nozzle is thinned year by year for the purpose of forming high-definition images. Under such circumstances, the ejection stability of the ink composition, among ink-jet recording properties, may not be sufficiently achieved in some case. A specific example of such case includes a case where after an ink is ejected from a predetermined nozzle in an ink-jet recording head and then the ejection of the ink from the nozzle is suspended for a certain period of time, it may be hard to stably eject the ink again when the ink is re-ejected from the nozzle. However, when the block copolymer according to the first aspect of the present invention is used, and the liquid composition according to the second aspect of the present invention is employed, such a problem can be significantly obviated. This is considered to be related to the fact that a solvent in the ink composition is vaporized at an ejection opening of a small-diameter nozzle to increase the concentration of the composition, thereby causing viscosity increase or crusting. In relation to this fact, the block copolymer according to the present invention, i.e. the amphiphilic block copolymer having an ionic functional group, wherein the ratio (N10/N5) of the rotational viscosity (N10) of a 10% by mass solution of the copolymer in purified water to the rotational viscosity (N5) of a 5% by mass solution of the copolymer in purified water is 2.5 or lower, can exhibit a critically great effect and make a considerable improvement because of such viscosity characteristics.

A remarkable feature in the present invention resides in the use of such a block copolymer that the ratio (N10/N5) of the rotational viscosity (N10) of a 10% by mass solution of the copolymer in purified water to the rotational viscosity (N5) of a 5% by mass solution of the copolymer in purified water is 2.5 or lower. This is considered to correlate to the great effect on the ejection stability in the present invention. In order to improve the ejection stability of the dispersed composition containing the copolymer according to the present invention, the content of the copolymer in the dispersed composition is preferably within a range of from 0.5% by weight to 10% by weight, more preferably from 1% by weight to 8% by weight, still more preferably from 1.5% by weight to 7% by weight. In that sense, taking into consideration the fact that the copolymer is preferably used in this range in the above-described coloring material-included ink, a further feature of the present invention can be recognized.

The liquid-applying apparatus according to the present invention will now be described.

The ink composition according to the present invention can be used in a liquid-applying apparatus using the liquid-applying method described above, a pattern-forming apparatus utilizing a pattern-forming method that a certain pattern is formed on a recording medium, and an image-forming apparatus utilizing various image-forming methods such as various printing methods to form images and characters on a recording medium, ink-jet methods, and electrophotographic methods. The ink composition is particularly preferably used in ink-jet recording apparatus.

Ink-jet recording apparatuses using the ink-jet inks according to the present invention include ink-jet recording apparatus like a piezo ink-jet system using a piezoelectric element and a thermal ink-jet system that thermal energy is applied to an ink to bubble the ink, thereby conducting recording.

Figure 1:
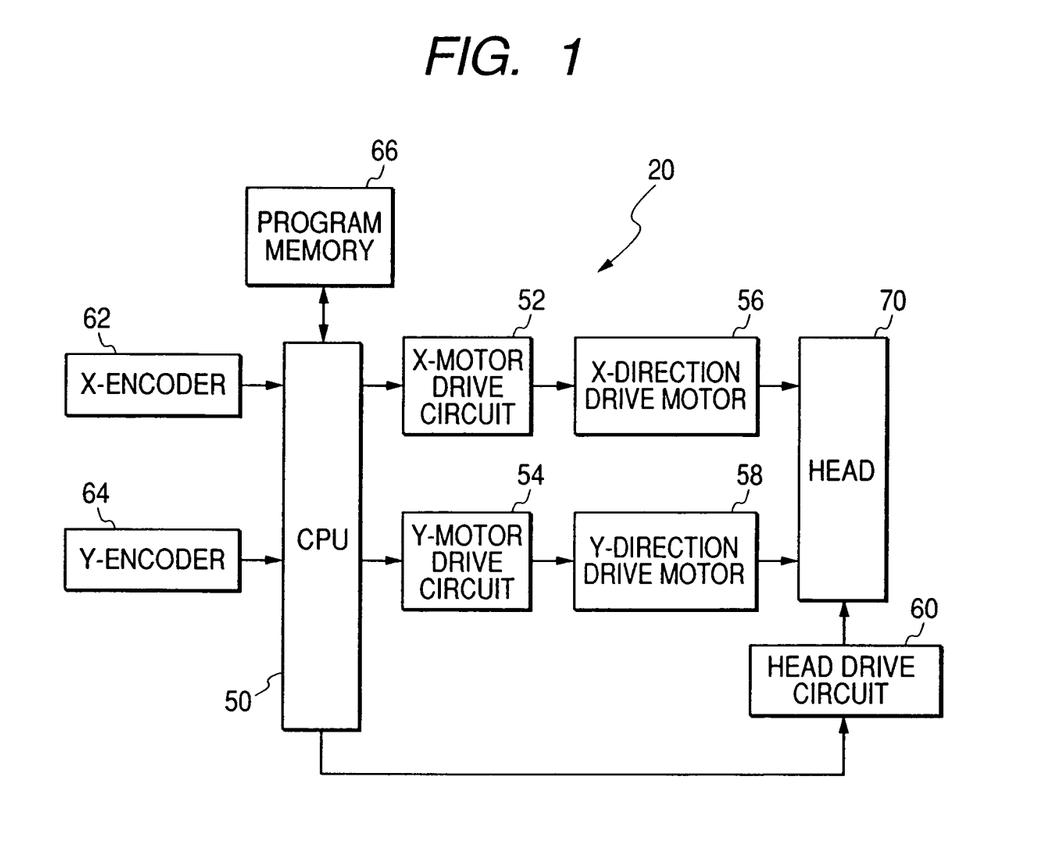
FIG. 1 schematically illustrates the mechanism of an ink-jet recording apparatus according to the present invention.

FIG. 1 illustrates a schematic functional diagram of an ink-jet recording apparatus. Reference numeral 50 indicates a central processing unit (CPU) of the ink-jet recording apparatus 20. A program for controlling the CPU 50 may be stored in a program memory 66 or may also be stored in a memory means such as EEPROM (not illustrated) as the so-called firmware. According to the ink-jet recording apparatus, recording data is received from a recording data-preparing means (not illustrated, computer or the like) to the program memory 66. The recording data may be information itself of images or characters to be recorded, compressed information thereof or encoded information. When the compressed or encoded information is processed, expansion or development can be conducted by the CPU 50 to obtain the information of the images or characters to be recorded. An X-encoder 62 (for example, relating to an X-direction or main scanning direction) and a Y-encoder 64 (for example, relating to a Y-direction or secondary scanning direction) can be provided to notify a relative position of a head to a recording medium to the CPU 50.

The CPU 50 sends signals for recording the images to an X-motor drive circuit 52, a Y-motor drive circuit 54 and a head drive circuit 60 on the basis of the information of the program memory 66, X-encoder 62 and Y-encoder 64. The X-motor drive circuit 52 and Y-motor drive circuit 54 drive an X-direction drive motor 56 and a Y-direction drive motor 58, respectively, to move a head 70 relatively to the recording medium and to a recording position. The head drive circuit 60 sends signals for conducting ejection of various kinds of ink compositions (Y, M, C and K) or a stimulus-imparting substance, which becomes stimuli, to the head 70 at the time the head 70 completes the shift to the recording position, thereby conducting recording. The head 70 may be a head for ejecting a single ink composition or a head for ejecting plural kinds of ink compositions. The head 70 may have a function for ejecting a stimulus-imparting substance, which causes stimuli, in combination, whereby color mixing (bleeding) or the like can be improved. The block copolymer according to the present invention may preferably have a stimuli-responding function corresponding thereto.

The present invention will hereinafter be described in detail by the following examples. However, the present invention is not limited to these examples.

EXAMPLE 1

Synthesis 1 of Block Copolymer

Synthesis of triblock copolymer composed of isobutyl vinyl ether (IBVE; block A), 2-(2-methoxyethyloxy)ethyl vinyl ether (block B) and ethyl 4-(2-vinyloxy)ethoxy-benzoate (VEOEtPhCOOEt; block C):

After the interior of a glass container equipped with a three-way stop-cock was purged with nitrogen, the container was heated to 250° C. under a nitrogen gas atmosphere to remove adsorbed water. After the system was returned to room temperature, 5.5 mmol of IBVE, 16 mmol of ethyl acetate, 0.05 mmol of 1-isobutoxyethyl acetate and 11 ml of toluene were added followed by cooling of the reaction system. At the time the temperature within the system reached 0° C., 0.2 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC) to confirm completion of the polymerization of a block A. At this time, Mn of the block A was 11,200, and Mw (weight average molecular weight)/Mn (number average molecular weight) was 1.10.

Then, 2.2 mmol of a monomer of a block B was added to continue the polymerization. After completion of the polymerization of the block B was confirmed by monitoring by means of GPC, a toluene solution of 5 mmol of a component of a block C was added to continue the polymerization. After 20 hours, the polymerization reaction was terminated. The termination of the polymerization reaction was conducted by adding a 0.3% by mass aqueous solution of ammonia/methanol into the system. The reaction mixture solution was diluted with dichloromethane and washed 3 times with 0.6 mol/L hydrochloric acid and then 3 times with distilled water. The resultant organic phase was concentrated and dried to solids by an evaporator, and the residue was vacuum-dried. The resultant product was dialyzed repeatedly in a methanol solvent using a semi-permeable membrane composed of cellulose to remove monomeric compounds, thereby obtaining the intended triblock polymer. The identification of the compound was conducted by means of NMR and GPC. Mn was 19,700, and Mw/Mn was 1.24. The polymerization ratio of A to B to C was 110:42:16.

The triblock polymer obtained above was hydrolyzed in a mixed solution of dimethylformamide and aqueous sodium hydroxide, whereby the block C component was hydrolyzed to obtain a triblock polymer in a form of a sodium salt. The identification of the compound was conducted by means of NMR and GPC.

This polymer was neutralized with 0.1N hydrochloric acid in an aqueous dispersion to obtain a triblock polymer, in which the block C component turned into a free carboxylic acid. The identification of the compound was conducted by means of NMR and GPC.

Synthesis 2 of Block Copolymer

Synthesis of triblock copolymer composed of isobutyl vinyl ether and $CH_2$=$CHOCH_2CH_2OPhPh$ (IBVE-r-VEEtPhPh; block A), 2-(2-methoxyethyloxy)ethyl vinyl ether (block B), and ethyl 4-(2-vinyloxy)ethoxybenzoate (block C):

After the interior of a glass container equipped with a three-way stop-cock was purged with nitrogen, the container was heated to 250° C. under a nitrogen gas atmosphere to remove adsorbed water. After the system was returned to room temperature, 5 mmol of IBVE, 5 mmol of VEEtPhPh, 16 mmol of ethyl acetate, 0.1 mmol of 1-isobutoxyethyl acetate and 11 ml of toluene were added followed by cooling of the reaction system. At the time the temperature within the system reached 0° C., 0.2 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC) to confirm completion of the polymerization of a block A. At this time, Mn of the block A was 13,200, and Mw/Mn was 1.10.

Then, 4.4 mmol of a monomer of a block B was added to continue the polymerization. After completion of the polymerization of the block B was confirmed by monitoring by means of GPC, a toluene solution of 4 mmol of a component of a block C was added to continue the polymerization. After 20 hours, the polymerization reaction was terminated. The termination of the polymerization reaction was conducted by adding a 0.3% by mass aqueous solution of ammonia/methanol into the system. The reaction mixture solution was diluted with dichloromethane and washed 3 times with 0.6 mol/L hydrochloric acid and then 3 times with distilled water. The resultant organic phase was concentrated and dried to solids by an evaporator, and the residue was vacuum-dried. The resultant product was dialyzed repeatedly in a methanol solvent using a semi-permeable membrane composed of cellulose to remove monomeric compounds, thereby obtaining the intended triblock polymer. The identification of the compound was conducted by means of NMR and GPC. Mn was 21,700, and Mw/Mn was 1.23. The polymerization ratio of A to B to C was 100:45:17. The polymerization ratio between the two monomers in the block A was 1:1.

The triblock polymer obtained above was hydrolyzed in a mixed solution of dimethylformamide and aqueous sodium hydroxide, whereby the block C component was hydrolyzed to obtain a triblock polymer in a form of a sodium salt. The identification of the compound was conducted by means of NMR and GPC.

This polymer was neutralized with 0.1N hydrochloric acid in an aqueous dispersion to obtain a triblock polymer, in which the block C component turned into a free carboxylic acid. The identification of the compound was conducted by means of NMR and GPC.

Synthesis 3 of Block Copolymer

Polymerization was conducted in the same manner as in Synthesis 2 except that the block A of the triblock polymer obtained by the polymerization in Synthesis 2 was changed to 4-methylphenylethyl vinyl ether. As a result, Mn of the block A was 13,200, and Mw/Mn was 1.21. The polymerization ratio of A to B to C was 99:43:17.

Syntheses 4 to 8 of Block Copolymers

The following copolymers were synthesized in a similar manner to Synthesis 3.

Synthesis 4

A triblock copolymer, in which Mn and Mw/Mn of the block A were respectively 13,100 and 1.10, Mn and Mw/Mn of the triblock copolymer were respectively 25,000 and 1.28, and the polymerization ratio of A to B to C was 99:65:17, was synthesized by using the same monomers as those in Synthesis 3.

Synthesis 5

A triblock copolymer, in which Mn and Mw/Mn of the block A were respectively 13,300 and 1.10, Mn and Mw/Mn of the triblock copolymer were respectively 23,400 and 1.26, and the polymerization ratio of A to B to C was 98:50:15, was synthesized by using the same monomers as those in Synthesis 3.

Synthesis 6

A triblock copolymer, in which Mn and Mw/Mn of the block A were respectively 13,300 and 1.10, Mn and Mw/Mn of the triblock copolymer were respectively 20,400 and 1.20, and the polymerization ratio of A to B to C was 98:30:15, was synthesized by using the same monomers as those in Synthesis 3.

Synthesis 7

A triblock copolymer, in which Mn and Mw/Mn of the block A were respectively 13,200 and 1.10, Mn and Mw/Mn of the triblock copolymer were respectively 27,200, and 1.36, and the polymerization ratio of A to B to C was 98:90:14, was synthesized by using the same monomers as those in Synthesis 3.

Synthesis 8

A triblock copolymer, in which Mn and Mw/Mn of the block A were respectively 12,900 and 1.11, Mn and Mw/Mn of the triblock copolymer were respectively 31,200 and 1.36, and the polymerization ratio of A to B to C was 98:130:14, was synthesized by using the same monomers as those in Synthesis 3.

Aqueous sodium hydroxide in a stoichiometric amount corresponding to the carboxylic acid was added to each of the block copolymers obtained in Syntheses 1 to 8 to ionize the copolymer into sodium carboxylate, thereby determining the ratio (N10/N5) of a rotational viscosity (N10) of a 10% by mass solution of the copolymer in purified water to a rotational viscosity (N5) of a 5% by mass solution of the copolymer in purified water by means of a rheometer manufactured by Rheologica Instruments. As a result, the ratios (N10/N5) of the block copolymers were 1.9, 1.8, 1.6, 2.0, 1.7, 1.4, 2.9 and 4.9, respectively. Even when the respective copolymers were isolated at the condition of carboxylates obtained after the hydrolyses in the course of the polymer syntheses and dispersed in purified water to conduct the same rotational viscosity measurement described above, the same results were obtained.

Incidentally, the rotational viscosity (N5) of a 5% by mass solution of the block copolymer in Synthesis 1 at 25° C. was 3.6 cp, the rotational viscosity (N10) of a 10% by mass solution thereof was 6.8 cp, and the ratio (N10/N5) between them was then 1.9.

EXAMPLE 2

Fifteen parts by mass of each of the block copolymers in the form of a carboxylate obtained in EXAMPLE 1 and 7 parts by mass of Oil Blue N (C.I. Solvent Blue 14, product of Aldrich Co.) were both dissolved in 150 parts by mass of dimethylformamide, and the resultant solution was inverted into a water phase with 400 parts by mass of distilled water to obtain an ink composition. Even when the respective ink compositions thus obtained were left to stand for 10 days, Oil Blue neither separated nor precipitated.

EXAMPLE 3

Fifteen parts by mass of each of the block copolymers in the form of a carboxylate obtained in Syntheses 1 to 8 of EXAMPLE 1 and 6 parts by mass of a cyan copper phthalocyanine pigment (product of Toyo Ink Mfg. Co., Ltd.) were both dissolved in 90 parts by mass of dimethylformamide, and the resultant solution was inverted into a water phase with 500 parts by mass of distilled water. Coarse particles were then removed there from by a membrane filter having a pore size of 2 μm, followed by addition of 13 parts by mass of glycerol and 12 parts by mass of ethylene glycol to obtain ink compositions.

The composition prepared with the block copolymer according to Synthesis 1 was observed through a clear transfer transmission type electron microscope. As a result, only spherical capsule-like particles were observed. It was thus found that all the pigment was included. Printing was conducted with the ink composition separately prepared with the block copolymers according to Syntheses 1 to 6 by means of an ink-jet recording apparatus (BJF 600, trade name, manufactured by Canon Inc.). As a result, the printing was conducted beautifully. No bleeding was observed when distilled water was applied to the printed area immediately after the printing.

EXAMPLE 4

The ink-jet recording apparatus used in EXAMPLE 3 and the ink compositions prepared in EXAMPLE 3 were used to conduct an ejection stability test in the following manner.

Each of the ink compositions was ejected again by 20 dots at a time from each nozzle of the ink-jet recording apparatus (BJF 600, trade name, manufactured by Canon Inc.) and then ejected again by 20 dots at a time from each nozzle after 6 seconds. This recording cycle was repeated 100 times. Optical densities of the respective recorded samples thus obtained were measured by means of an optical densitometer (RD-19, trade name, manufactured by Sakata Inx Corporation). As a result, the optical densities of the recorded samples obtained from the ink compositions 1 to 8 respectively containing the block copolymers according to Syntheses 1 to 8 were 0.68, 0.72, 0.76, 0.69, 0.71, 0.77, 0.34 and 0.25, respectively. Recording disorder was observed on the recorded samples obtained from the ink compositions by Syntheses 7 and 8.

COMPARATIVE EXAMPLE 1

Two parts by mass of a black self-dispersing pigment (CAB-O-JET300, trade names; products of Cabot Company), 0.5 parts by mass of a surfactant (Nonion E-230, trade name, product of NOF Corporation), 5 parts by mass of ethylene glycol and 92.5 parts by mass of ion-exchanged water were mixed to prepare an ink composition. Recording was conducted in the same manner as in EXAMPLE 3 using this ink composition. The black color was strongly bled when water was applied to the printed area after 1 minute.

COMPARATIVE EXAMPLE 2

An ink-jet ink was prepared in the same manner as in EXAMPLE 1 except that the block copolymer according to EXAMPLE 1 was changed to a 1:1 random copolymer of styrene and sodium acrylate (Mn=22,000, Mw/Mn=1.98). Similar to EXAMPLE 4, an ejection stability test was conducted in the following manner. The ink was ejected by 20 dots at a time from each nozzle of the ink-jet recording apparatus (BJF 600, trade name, manufactured by Canon Inc.) and then ejected again by 20 dots at a time from each nozzle after 6 seconds. This recording cycle was repeated 100 times. The optical density of the recorded sample thus obtained was measured by means of an optical densitometer manufactured by Sakata Inx Corporation. As a result, the optical density of the recorded sample obtained from the ink was 0.10. Remarkable recording disorder was observed on this recorded sample.

EXAMPLE 5

Synthesis 9 of Block Copolymer

A triblock copolymer 9 (polymerization ratio: 86/41/16, Mn=16,600, Mw/Mn=1.31) composed of 4-methylphenylethyl vinyl ether (block A), 2-{2-(2-methoxyethyloxy) ethyloxy}ethyl vinyl ether (block B) and ethyl 4-(2-vinyloxy) ethoxybenzoate (block C) was synthesized in a similar manner to EXAMPLE 1.

Aqueous sodium hydroxide in a stoichiometric amount corresponding to the carboxylic acid was added to this block copolymer to ionize the copolymer into sodium carboxylate, thereby determining the ratio (N10/N5) of a rotational viscosity (N10) of a 10% by mass solution of the copolymer in purified water to a rotational viscosity (N5) of a 5% by mass solution of the copolymer in purified water by means of a rheometer manufactured by Rheologica Instruments. As a result, the ratio (N10/N5) of the block copolymer was 2.0

This polymer was used to prepare an ink composition in a similar manner to EXAMPLE 3. This ink composition was used to conduct an ejection stability test in the following manner. The ink was ejected by 1 dot at a time from each nozzle of the ink-jet recording apparatus (BJF 600, trade name, manufactured by Canon Inc.) and then ejected again by 1 dot at a time from each nozzle after 6 seconds. This recording cycle was repeated 100 times. The optical density of the recorded sample thus obtained was measured by means of an optical densitometer manufactured by Sakata Inx Corporation. As a result, the optical density of the recorded sample obtained from the ink composition was 0.70. No bleeding was observed when water was applied to the printed area after the printing.

EXAMPLE 6

Syntheses 10 to 13 of Block Copolymers

The following copolymers were synthesized in a similar manner to EXAMPLE 5.

Synthesis 10

A triblock copolymer, in which Mn and Mw/Mn of the block A were respectively 8,100 and 1.10, Mn and Mw/Mn of the triblock copolymer were respectively 11,900 and 1.19, and the polymerization ratio of A to B to C was 44:10:10, was synthesized by using the same monomers as those in EXAMPLE 5.

Synthesis 11

A triblock copolymer, in which Mn and Mw/Mn of the block A were respectively 9,700 and 1.09, Mn and Mw/Mn of the triblock copolymer were respectively 14,100 and 1.16, and the polymerization ratio of A to B to C was 58:21:9, was synthesized by using the same monomers as those in EXAMPLE 5.

Synthesis 12

After a block A (Mn=13,000, Mw/Mn=1.08) was synthesized, the monomer of the segment B and the monomer of the segment C used in Synthesis 9 were charged at the same time to synthesize a diblock copolymer the hydrophilic segment of which was a copolymer of both the monomer units. The number average molecular weight Mn of the copolymer thus synthesized was 20,700, Mw/Mn was 1.08, and the polymerization ratio of A to (B/C) was 89:(24/27).

Synthesis 13

A triblock copolymer, in which Mn and Mw/Mn of the block A were respectively 8,200 and 1.07, Mn and Mw/Mn of the triblock copolymer were respectively 12,200 and 1.19, and the polymerization ratio of A to B to C was 58:19:9, was synthesized in the same manner as in Synthesis 11 except that the monomer used in the block A was changed to 2-phenyloxyethyl vinyl ether.

Aqueous potassium hydroxide in a stoichiometric amount corresponding to the carboxylic acid was added to each of the block copolymers obtained above to ionize the copolymer into potassium carboxylate, thereby determining the ratio (N10/N5) of the rotational viscosity (N10) of a 10% by mass solution of the copolymer in purified water to the rotational viscosity (N5) of a 5% by mass solution of the copolymer in purified water by means of a rheometer manufactured by Rheologica Instruments. As a result, the ratios (N10/N5) of the block copolymers were 1.8, 1.8, 2.2 and 1.6, respectively.

These copolymers were used to prepare ink compositions in a similar manner to EXAMPLE 3. The ink compositions were used to conduct an ejection stability test in the following manner. Each of the ink compositions was ejected by 1 dot at a time from each nozzle of the ink-jet recording apparatus (BJF 600, trade name, manufactured by Canon Inc.) and then ejected again by 1 dot at a time from each nozzle after 6 seconds. This recording cycle was repeated 100 times. Optical densities of the respective recorded samples thus obtained were measured by means of an optical densitometer manufactured by Sakata Inx Corporation. As a result, the optical densities of the recorded samples obtained from the ink compositions were 0.74, 0.80, 0.69 and 0.84, respectively. No bleeding was observed on the recorded samples when water was applied to the respective printed areas after the printing.

According to the present invention, there can be provided block copolymers, by which a functional substance can be satisfactorily dispersed in a solvent, polymer-containing compositions containing such a block copolymer and having good dispersibility, fixing ability and environmental resistance, and a method and an apparatus for applying a liquid using the polymer-containing composition. Thus, the present invention can be applicable to such image-forming technology as utilized in offices, homes and the like, typified by the electrophotographic technology and ink-jet technology.

This application claims priority from Japanese Patent Application No. 2004-008497 filed Jan. 15, 2004, which is hereby incorporated by reference herein.

We claim:

1. An amphiphilic block copolymer having an ionic functional group, wherein a ratio (N10/N5) of a rotational viscosity (N10) of a 10% by mass solution of the copolymer in purified water to a rotational viscosity (N5) of a 5% by mass solution of the copolymer in purified water is 2.5 or lower,
   wherein the copolymer has a structure in which a hydrophobic block segment, a nonionic hydrophilic segment, and an ionic hydrophilic segment are arranged in that order, and
   wherein a degree of polymerization ratio between the hydrophobic block segment, nonionic hydrophilic segment, and ionic hydrophilic segment arranged in that order is such that a proportion of a degree of polymerization of the nonionic hydrophilic segment is 8 or lower and a proportion of a degree of polymerization of the ionic hydrophilic segment is 5 or lower when a proportion of a degree of polymerization of the hydrophobic block segment is regarded as 10.

2. The amphiphilic block copolymer according to claim 1, which contains a polyvinyl ether structure as a repeating unit structure.

3. The amphiphilic block copolymer according to claim 1, wherein the ionic segment is a repeating unit represented by the following general formula (1):

wherein $R^0$ is —X—(COOH)$_r$ or —X—(COO-M)$_r$,
wherein X is:
(1) a linear, branched or cyclic alkylene group having 1 to 20 carbon atoms, or
(2) —(CH($R^5$)—CH($R^6$)—O)$_p$—CH$_{3-r}$—, or
(3) —(CH$_2$)$_m$—(O)$_n$—(CH$_2$)$_q$—CH$_{3-r}$, or
(4) a modified structure of (1) through (3) in which at least one of the methylene groups of these groups is substituted by a carbonyl group or an aromatic ring structure, and
wherein r is 1 or 2, p is an integer of from 1 to 18, m is an integer of from 0 to 35, n is 1 or 0, q is an integer of from 0 to 17, M is a monovalent or polyvalent cation, and $R^5$ and $R^6$ are alkyl groups and may be the same or different from each other.

4. The amphiphilic block copolymer according to claim 1, wherein at least one of the hydrophobic block segment, nonionic hydrophilic segment, and ionic hydrophilic segment is a repeating unit represented by the following general formula (2):

wherein $R^1$ is selected from the group consisting of a linear, branched, or cyclic alkyl group having 1 to 18 carbon atoms, -Ph, -Pyr, —(CH($R^5$)—CH($R^6$)—O)$_p$- $R^7$, and —(CH$_2$)$_m$—(O)$_n$-$R^7$, in which hydrogen and carbon in the aromatic ring may be substituted by a linear or branched alkyl group having 1 to 4 carbon atoms and nitrogen, respectively, p is an integer of from 1 to 18, m is an integer of from 1 to 36, n is 1 or 0, $R^5$ and $R^6$ are, independently of each other, hydrogen or —CH$_3$, and $R^7$ is hydrogen, a linear, branched, or cyclic alkyl group having 1 to 18 carbon atoms, -Ph, -Pyr, —CHO, —CH$_2$CHO, —CO—CH=CH$_2$, —CO—C(CH$_3$)=CH$_2$, or —CH$_2$COOR$^8$, with the proviso that when $R^7$ is any other group than hydrogen, hydrogen bonded to carbon in $R^7$ may be substituted by a linear or branched alkyl group having 1 to 4 carbon atoms, —F, —Cl, or —Br, and carbon in the aromatic ring may be substituted by nitrogen, in which $R^8$ is an alkyl group having 1 to 5 carbon atoms, and Ph and Pyr denote a phenyl group and a pyridyl group, respectively.

5. A polymer-containing composition comprising a block copolymer, a solvent or a dispersing medium, and a functional substance,
   wherein the block copolymer is the amphiphilic block copolymer according to any one of claims 1, 3, and 4.

6. The polymer-containing composition according to claim 5, wherein the functional substance is included in the block copolymer.

7. The polymer-containing composition according to claim 5, wherein the block copolymer is contained in a proportion of 1% by mass or more.

8. A liquid-applying method comprising ejecting the polymer-containing composition according to claim 5 on a recording medium by applying energy to the polymer-containing composition to eject.

* * * * *